United States Patent [19]
Furukawa

[11] Patent Number: 5,876,874
[45] Date of Patent: Mar. 2, 1999

[54] NICKEL ELECTRODE FOR SECONDARY BATTERY

[75] Inventor: Jun Furukawa, Fukushima, Japan

[73] Assignee: Furukawa Denchi Kabushiki Kaisha, Yokohama, Japan

[21] Appl. No.: 863,220

[22] Filed: May 27, 1997

[30] Foreign Application Priority Data

May 31, 1996 [JP] Japan ................................. 8-160581

[51] Int. Cl.⁶ ...................................................... H01M 4/52
[52] U.S. Cl. .............................................. 429/223; 429/218
[58] Field of Search ....................................... 429/223, 218

[56] References Cited

U.S. PATENT DOCUMENTS 5,523,182  6/1996  Ovshinsky et al. ................. 429/223
5,571,636  11/1996  Ohta et al. ......................... 429/223 X
5,700,596  12/1997  Ikoma et al. ....................... 429/223 X

*Primary Examiner*—John S. Maples
*Attorney, Agent, or Firm*—Frishauf, Holtz, Goodman, Langer & Chick, P.C.

[57] ABSTRACT

Disclosed is a nickel electrode for secondary battery, which ensures high packing density of an active material and improvement in a efficiency factor of the active material. The nickel electrode comprises a current collector supporting an active mixture material containing $Ni(OH)_2$ powder and CoO powder and/or $Co(OH)_2$ powder as essential components, wherein said $Co(OH)_2$ powder and/or CoO powder are spherical or almost spherical in shape.

17 Claims, 1 Drawing Sheet

NICKEL ELECTRODE FOR SECONDARY BATTERY

BACKGROUND OF THE INVENTION

1. Field of the Invention

This invention relates to a nickel electrode which is incorporated as the positive electrode of a nickel/hydrogen secondary battery, nickel/zinc secondary battery, nickel/cadmium secondary battery, and the like, more specifically, to a nickel electrode for secondary battery, ensuring a provision of a battery which is increased in the packing density of an active material into a current collector, which realizes a high efficiency as an active material, and which has a high average discharge voltage.

2. Prior Art

Alkali secondary batteries, such as a nickel/hydrogen secondary battery, nickel/zinc secondary battery, nickel/cadmium secondary battery, and the like, have a structure in which a generating element and a specific alkali electrolytic solution are together sealed in a cell case. The generating element is formed by laminating a positive nickel electrode and a specific negative electrode via a separator. The nickel electrodes incorporated as a positive electrode are mainly classified into an sintered type and a non-sintered type.

Among these, a nickel electrode of the latter non-sintered type is generally manufactured by the following processes.

Specifically, $Ni(OH)_2$ powder which acts as an active material, an electroconductive material powder such as Ni powder, and an aqueous solution of a thickener such as an aqueous solution of carboxymethyl cellulose, are uniformly mixed each in a predetermined ratio, formulating, as required, a binder such as a PTFE dispersion, to prepare an active material-mixture paste. This mixture paste is filled into a current collector having a three dimensional network structure such as a foaming nickel plate so that the packing density accords with a designed value, which is then dried and rolled in order. The rolled product is cut into a specific size to produce a nickel electrode.

In this case, it is known that CoO powder or $Co(OH)_2$ powder is further added when the mixture paste is prepared. This is because of the following reason.

Specifically, illustrating a nickel electrode to which CoO powder or $Co(OH)_2$ powder are added, these Co compounds dissolve in an alkali electrolytic solution to form a complex ion. This complex ion precipitates as an electroconductive —CoOOH on $Ni(OH)_2$ powder as an active material and a current collector in the stage of charging for an initial activating treatment to form an electroconductive network, whereby the efficiency of $Ni(OH)_2$ as an active material is improved.

As CoO powder or $Co(OH)_2$ powder showing such effects, the following materials are conventionally used.

Specifically, as examples of $Co(OH)_2$ powder, dry powder of a precipitate prepared, for example, by a reaction of an aqueous solution of NaOH with an aqueous solution of $CoSO_4$ is given. Also, CoO powder can be prepared by heat-treating the above $Co(OH)_2$ powder in a non-oxidizing atmosphere such as a nitrogen atmosphere.

The $Co(OH)_2$ powder has almost a hexagonal plate shape or undefined shape since the crystal structure of $Co(OH)_2$ belongs to a hexagonal system. The shape of the CoO powder derived from the aforesaid $Co(OH)_2$ powder is also similar to that of the $Co(OH)_2$ powder.

These powdery materials exist as a secondary aggregated substance of a primary particle having a particle diameter of 1 µm or less. The secondary aggregated substance is served for the actual use when the above mixture paste is prepared.

As mentioned above, the CoO powder or $Co(OH)_2$ powder is dissolved once in an alkali electrolytic solution and precipitated as β-CoOOH at the stage of charging of the initial activating treatment to form an electroconductive network on the surfaces of $Ni(OH)_2$ powder and of a current collector, and thereby to lower the polarization of the nickel electrode so that the CoO powder or $Co(OH)_2$ powder works to improve the efficiency of an active material.

Accordingly, it is desirable that the electroconductive network be not only formed on part of the surface of $Ni(OH)_2$ powder or the current collector, but also formed uniformly on the whole surfaces thereof so that the above effect can be sufficiently exhibited.

For realizing such a condition, it is preferable that the CoO powder or $Co(OH)_2$ powder be uniformly dispersed in the entire mixture paste without maldistribution.

However, $Co(OH)_2$ powder or CoO powder is a secondary aggregated substance formed of a micropowder having a hexagonal plate shape or undefined shape and a size of smaller than 1 µm as mentioned above. When preparing the mixture paste, $Co(OH)_2$ powder or CoO powder conventionally used tends to be maldistributed in the paste in a state of a small nodule of a secondary aggregated substance when the mixture paste is prepared, exhibiting a problem that the uniform dispersion of the $Co(OH)_2$ powder or CoO powder is difficult.

Also, because the powder actually used in the step of preparing the mixture paste is a secondary aggregated substance, its tap density is small. Therefore, when producing a nickel electrode by filling a predetermined amount of a mixture paste prepared by formulating the powder in a predetermined amount, the relative amount of an active material to that of the mixture paste becomes small. The packing density of an active material in a current collector is small, which is not desirable for preparing a nickel electrode having high capacity.

OBJECTS AND SUMMARY OF THE INVENTION

The object of the present invention is to provide a nickel electrode for secondary battery, using $Co(OH)_2$ powder or CoO powder capable of being uniformly dispersed instead of $Co(OH)_2$ powder or CoO powder conventionally used, whereby the packing density of an active material into a current collector is high, an efficiency of an active material is increased, and a high average discharge voltage for battery is realized.

The above object can be attained in the present invention by a provision of a nickel electrode comprising a current collector supporting an active material mixture containing $Ni(OH)_2$ powder and CoO powder and/or $Co(OH)_2$ powder as essential components, wherein said $Co(OH)_2$ powder and/or CoO powder are spherical or almost spherical in shape.

It is preferable that said CoO powder has an average particle diameter of from 1 to 30 µm, a specific surface area of from 10 to 40 $m^2/g$, and a tap density of from 0.5 to 1.5 $g/cm^3$. Also, it is preferable that said $Co(OH)_2$ powder has an average particle diameter of from 1 to 30 µm, a specific surface area of from 10 to 40 $m^2/g$, and a tap density of from 1.0 to 2.5 $g/cm^3$.

DETAILED DESCRIPTION OF THE INVENTION

Figure 1:
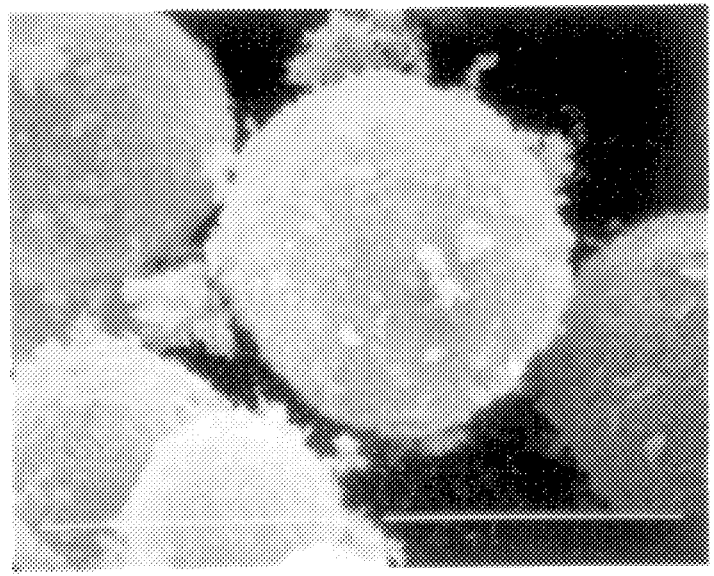
FIG. 1 shows a scanning electron micrograph (a magnification of 3750) substituted for a figure, showing the shape of CoO powder used in Example.

The nickel electrode of the present invention is similar to conventionally known nickel electrodes except that an active material mixture supported by a current collector contains spherical $Ni(OH)_2$ powder and $Co(OH)_2$ powder and/or CoO powder as essential components and $Co(OH)_2$ powder and/or CoO powder are spherical or almost spherical in shape.

Because both CoO powder and $Co(OH)_2$ powder used in the present invention are spherical or almost spherical in shape, these are resistant to the formation of a secondary aggregated substance resulting from the aggregation among respective particles of these. The dispersibilities of these are therefore excellent in the step of preparing a mixture paste so that these are uniformly dispersed in the mixture paste with ease.

Also, because CoO powder and $Co(OH)_2$ powder are resistant to secondary aggregation, the tap density is high and hence the prepared mixture paste can be filled into a current collector in high density.

When CoO powder and $Co(OH)_2$ powder are excessively small sized, uniform mixing with other components in the step of preparing the mixture paste is operationally difficult so that a small nodule tends to be produced in the mixture paste. On the other hand, when CoO powder and $Co(OH)_2$ powder are excessively large sized, the above-described electroconductive network of $\beta$-COOOH to be produced in the nickel electrode cannot be formed uniformly on the entire surface of $Ni(OH)_2$ powder and the like, even if CoO powder and $Co(OH)_2$ powder are formulated in prescribed amounts. As a result, uniform dispersion of these Co compounds is not substantially realized. From these points, the particle diameter of each of these Co compounds is preferably from 1 to 30 $\mu$m, more preferably from 1 to 20 $\mu$m.

Incidentally, the numerical values of the particle diameter in the present invention is those measured using a particle size distribution measuring apparatus of a laser diffraction-scattering type (LMS-24, manufactured by Seishin Corporation).

Also, CoO powder and $Co(OH)_2$ powder have preferably a specific surface area (measured using a BET method) of from 10 to 40 $m^2/g$, more preferably from 20 to 40 $m^2/g$ respectively.

If the specific surface area is too small, these Co compounds cannot dissolve easily in an alkali electrolytic solution and hence the above-described electroconductive network of $\beta$-CoOOH cannot be formed with ease. Alternatively, if the specific surface area is too large, the Co compounds tend to be air-oxidized, for example, during storage prior to actual use, exhibiting the problem that $Co_3O_4$ is produced so that the Co compounds are inactivated.

When using CoO powder and $Co(OH)_2$ powder in the present invention, $Co(OH)_2$ powder and CoO powder have tap densities of preferably from 1.0 to 2.5 $g/cm^3$ and from 0.5 to 1.5 $g/cm^3$, more preferably from 1.2 to 2.5 $g/cm^3$ and from 0.6 to 1.5 $g/cm^3$ respectively in consideration of high density packing of the prepared mixture paste into the current collector.

Incidentally, the numerical values of the tap density in the present invention is those measured using a tap density measuring apparatus (Tap Denser KYT-3000, manufactured by Seishin Corporation).

$Co(OH)_2$ powder used in the present invention can be manufactured by the following process:

Predetermined concentrations of aqueous $CoSO_4$ solution and aqueous NaOH solution are mixed. To the mixed solution was added a pH adjuster to maintain the pH value at 9–13. As the pH adjuster, aqueous ammonia, ammonia gas, ammonium nitrate, or the like is used.

The entire solution is agitated for prescribed time, while keeping the solution temperature at 30°–70° C., thereby advancing the reaction to prepare $Co(OH)_2$ as a precipitate.

Here, the average particle diameter, specific surface area, and tap density of $Co(OH)_2$ powder to be produced can be controlled by appropriately selecting the pH value, solution temperature, adding speed of $COSO_4$ solution and NaOH solution, agitating condition, and the like.

For example, the tap density greatly varies depending on the pH of the reaction system. When the pH of the system is controlled in the above-defined range, $Co(OH)_2$ powder to be obtained or CoO powder produced by the heat-treatment of $Co(OH)_2$ is entirely spherical in shape and quite resistant to secondary aggregation. The tap density is thereby increased.

On the contrary, if the pH is not controlled, $Co(OH)_2$ powder or CoO powder is obtained as a secondary aggregated substance of primary microparticles. Also, all of these are not spherical in shape so that the tap densities of these decrease.

In addition, CoO powder can be prepared by heating $Co(OH)_2$ produced in the above manner, for example, at 400°–800° C. in a nitrogen atmosphere.

The nickel electrode of the present invention can be prepared by mixing $Ni(OH)_2$ powder, the above described $Co(OH)_2$ powder and/or CoO powder, and, as required, other components such as nickel powder to prepare a mixture paste and by filling the mixture paste into a current collector, followed by drying, rolling, and cutting.

If the content ratio of $Co(OH)_2$ powder and CoO powder is too small in the step of preparing the mixture paste, the above-mentioned effects of these Co compounds in the resulting nickel electrode cannot be obtained. Alternatively, if the content ratio of these Co compounds is too large, the relative ratio of $Ni(OH)_2$ in the mixture paste decreases, preparation of a nickel electrode having high capacity is hindered and polarization of a nickel electrode increases at the time of rapid discharge. From the above points of view, it is preferable that the content ratio of $Co(OH)_2$ powder and CoO powder be both from 5 to 10 parts by weight to 100 parts by weight of $Ni(OH)_2$ powder.

In addition, in the step of preparing a mixture slurry, if such a powdery material of a spherical shape as disclosed in Japanese Patent Application Laid-open No. 80513/1992 is used as powder $Ni(OH)_2$, a mixture slurry, in which each powdery component is more uniformly dispersed each other, can be prepared, which is advantageous.

EXAMPLES (1) preparation of $Co(OH)_2$ powder and CoO powder

An aqueous $CoSO_4$ solution (a concentration of 16 mol/$dm^3$), an aqueous NaOH solution (a concentration of 4.5 mol/$dm^3$) and an aqueous ammonia (a concentration of 25%) were mixed. And the mixed solution was agitated for three hours while keeping the mixed solution at a pH of 11 and a temperature of 60° C. to advance a reaction.

The resulting reaction precipitates were filtered and then washed and dried to prepare $Co(OH)_2$ powder.

The resulting $Co(OH)_2$ powder was then heated at 600° C. in a nitrogen atmosphere to produce CoO powder.

FIG. 1 shows a scanning electron micrograph (a magnification of 3750) of CoO powder prepared in this Example.

As is clear from FIG. 1, each particle of this CoO powder is spherical as a whole. Also, each particle is not aggregated.

Figure 2:
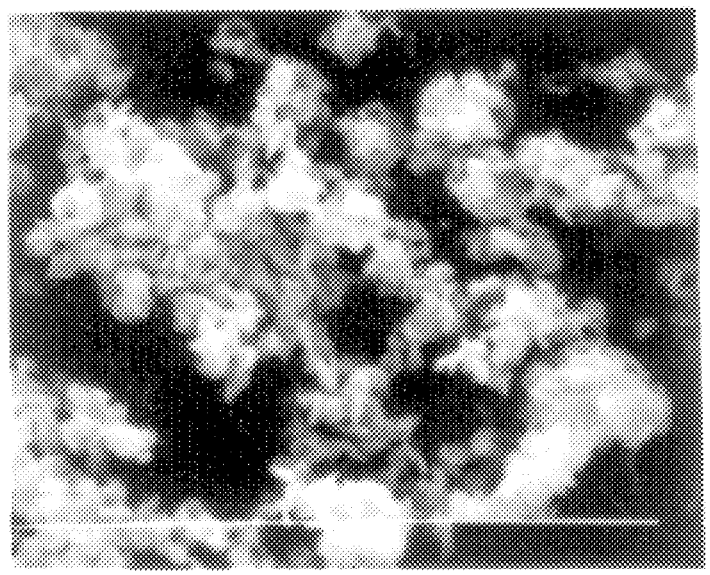
FIG. 2 shows a scanning electron micrograph (a magnification of 3750) substituted for a figure, showing the shape of CoO powder used in Comparative Example.

On the other hand, $Co(OH)_2$ for Comparative Example was prepared in the same manner as in Example except for the pH adjustment using aqueous ammonia. Also, resulting $Co(OH)_2$ was heated to CoO powder. FIG. 2 shows a scanning electron micrograph (a magnification of 3750) of CoO powder prepared in Comparative Example.

As is clear from FIG. 2, each particle of this CoO powder is formed of secondary aggregated substance of primary particles of a micro-size. Also, the entire shape of the CoO powder is not spherical.

The average particle diameter, specific surface area, and tap density of each of the above four kinds of powdery materials were measured. The results are shown in Table 1.

TABLE 1

|  | Average particle diameter ($\mu$m) | Specific surface area ($g/m^2$) | Tap density ($g/cm^3$) |
| --- | --- | --- | --- |
| $Co(OH)_2$ powder of Example | 7 | 30 | 1.5 |
| $Co(OH)_2$ powder of Comparative Example | 4 (Secondary aggregation) | 50 | 0.8 |
| CoO powder of Example | 7 | 25 | 1.0 |
| CoO powder of Comparative Example | 4 (Secondary aggregation) | 45 | 0.4 |

(2) Producing of Nickel electrode 8 parts by weight of each of the powdery materials shown in Table 1 and 37 parts by weight of an aqueous carboxymethyl cellulose solution (a concentration of 1.2% by weight) were mixed with 100 parts by weight of spherically $Ni(OH)_2$ powder in which 4% by weight of Zn and 1.5% by weight of Co were solid-dissolved to prepare four kinds of mixture pastes.

Each of the mixture pastes was filled into a foaming nickel plate having a weight per unit area of 550 $g/m^2$ and a thickness of 1.2 mm. The resulting perforated nickel plate was dried at 80° C. for one hour and rolled under a pressure of 2 $ton/cm^2$ in order to produce a nickel electrode of a 72 mm length, 41 mm wide, and 0.5 mm thickness.

For each nickel electrode, the packing density of $Ni(OH)_2$ powder which was an active material was calculated. The results are shown in Table 2.

TABLE 2

|  | Packing density of $Ni(OH)_2$ powder ($g/cm^3$) |
| --- | --- |
| Nickel electrode using $Co(OH)_2$ powder of Example | 2.68 |
| Nickel electrode using $Co(OH)_2$ powder of Comparative Example | 2.57 |
| Nickel electrode using CoO powder of Example | 2.65 |
| Nickel electrode using CoO powder of Comparative Example | 2.55 |

(3) Fabrication of Nickel-Hydrogen Secondary battery and Characteristics thereof Combining each nickel electrode, a conventionally known hydrogen occlusion alloy electrode, and a separator and using a known alkali electrolytic solution, a nickel-hydrogen secondary battery of a AA size and 1200 mAh was fabricated.

Five samples of each battery were subjected to an initial activating treatment which was performed at room temperature in the conditions of 150% charging at a 0.2 C and discharging to a terminating voltage of 1.0 V at a 0.2 C. Then, after charging at a 0.2 C for 7.5 hours, each sample was discharged at a 0.2 C to measure the efficiency of an active material for nickel electrode and the average discharge voltage of battery. The results are shown in Table 3 as the average of five samples per each battery.

TABLE 3

|  | Efficiency of $Ni(OH)_2$ powder (%) | Average discharge voltage of battery (V) |
| --- | --- | --- |
| Nickel electrode using $Co(OH)_2$ powder of Example | 103 | 1.250 |
| Nickel electrode using $Co(OH)_2$ powder of Comparative Example | 98 | 1.245 |
| Nickel electrode using CoO powder of Example | 105 | 1.245 |
| Nickel electrode using CoO powder of Comparative Example | 101 | 1.240 |

As is clear from the above results, in the nickel electrode of the present invention, $Co(OH)_2$ powder and CoO powder comprised of the mixture paste are both spherical in shape (see FIG. 1) and the tap density is high (see Table 1). As shown in FIG. 2, the packing density of an activating material is high, realizing high density packing of the mixture paste.

Also, the battery incorporated with the nickel electrode of the present invention is, as shown in FIG. 3, increased in the average discharge voltage. This shows that the polarization of the nickel electrode is small and discharging smoothly proceeds. As is clear from the results of the efficiency in Table 3, this means that the efficiency of an activating material of the nickel electrode is high.

From the above illustrations, it is clear that in the nickel electrode of the present invention, the efficiency of $Ni(OH)_2$ powder (activating material) carried by the nickel electrode is improved.

This is because, as CoO powder and/or $Co(OH)_2$ powder formulated to form electroconductive network of —CoOOH on the surface of $Ni(OH)_2$ powder, spherical or almost spherical powdery materials are used so that these powdery material are uniformly dispersed in mixture slurry.

Also, the use of such a powdery material ensures high density packing of the prepared mixture slurry into a current collector, whereby the packing density of an activating material is high and hence a nickel electrode having a high capacity can be produced.

What is claimed is:

1. A nickel electrode for a secondary battery comprising:
a current collector supporting an active mixture material containing (i) $Ni(OH)_2$ powder and (ii) a cobalt-containing powder selected from the group consisting of at least one of CoO powder and $Co(OH)_2$ powder as essential components, said cobalt-containing powder comprising particles which are spherical or almost spherical in shape.

2. The nickel electrode for a secondary battery according to claim 1, wherein said cobalt-containing powder comprises CoO powder having an average particle diameter of from 1 to 30 μm, a specific surface area of from 10 to 40 m$^2$/g, and a tap density of from 0.5 to 1.5 g/cm$^3$.

3. The nickel electrode for a secondary battery according to claim 1, wherein said cobalt-containing powder comprises Co(OH)$_2$ powder having an average particle diameter of from 1 to 30 μm, a specific surface area of from 10 to 40 m$^2$/g, and a tap density of from 1.0 to 2.5 g/cm$^3$.

4. The nickel electrode for a secondary battery according to claim 1, wherein said Ni(OH)$_2$ powder is spherical or almost spherical in shape.

5. The nickel electrode for a secondary battery according to claim 2, wherein the tap density is 0.6 to 1.5 g/cm$^3$.

6. The nickel electrode for a secondary battery according to claim 3, wherein the tap density is 1.2 to 2.5 g/cm$^3$.

7. The nickel electrode for a secondary battery according to claim 2, wherein the specific surface area is 20 to 40 m$^2$/g.

8. The nickel electrode for a secondary battery according to claim 3, wherein the specific surface area is 20 to 40 m$^2$/g.

9. The nickel electrode for a secondary battery according to claim 5, wherein the specific surface area is 20 to 40 m$^2$/g.

10. The nickel electrode for a secondary battery according to claim 6, wherein the specific surface area is 20 to 40 m$^2$/g.

11. The nickel electrode for a secondary battery according to claim 1, wherein the cobalt-containing powder comprises a CoO powder and a Co(OH)$_2$ powder.

12. The nickel electrode for a secondary battery according to claim 11, wherein the COO powder has an average diameter of 1 to 30 μm, a specific surface area of 10 to 40 m$^2$/g and a tap density of 1.0 to 2.5 g/cm$^3$.

13. The nickel electrode for a secondary battery according to claim 11, wherein the Co(OH)$_2$ powder and the CoO powder are both in an amount of 5 to 10 parts by weight to 100 parts by weight of the Ni(OH)$_2$ powder.

14. The nickel electrode for a secondary battery according to claim 12, wherein the Co(OH)$_2$ powder and the CoO powder are both in an amount of 5 to 10 parts by weight to 100 parts by weight of the Ni(OH)$_2$ powder.

15. The nickel electrode for a secondary battery according to claim 1, wherein the cobalt-containing powder comprises Co(OH)$_2$ powder produced by mixing an aqueous CoSO$_4$ solution with an aqueous NaOH solution to form a mixed solution and adding a pH adjuster to the mixed solution to maintain a pH value of 9 to 13, agitating the resultant mixed solution containing the pH adjuster and maintaining a solution temperature of 30° to 70° C. to precipitate spherical Co(OH)$_2$ particles.

16. The nickel electrode for a secondary battery according to claim 1, wherein the cobalt-containing powder comprises CoO powder produced by mixing an aqueous CoSO$_4$ solution with an aqueous NaOH solution to form a mixed solution and adding a pH adjuster to the mixed solution to maintain a pH value of 9 to 13, agitating the resultant mixed solution containing the pH adjuster, maintaining a solution temperature of 30° to 70° C. to precipitate spherical Co(OH)$_2$ particles, and heating the Co(OH)$_2$ particles at a temperature of 400° to 800° C. in a non-oxidizing atmosphere.

17. A nickel electrode for a secondary battery comprising a current collector supporting an active mixture comprising (i) Ni(OH)$_2$ powder and (ii) 5 to 10 parts by weight of a cobalt-containing powder based on 100 parts by weight of the Ni(OH)$_2$ powder, the cobalt-containing powder being selected from the group consisting of at least one of CoO powder and Co(OH)$_2$ powder, the cobalt-containing powder consisting essentially of spherical or substantially spherical particles.

* * * * *